United States Patent

[11] 3,577,955

| [72] | Inventor | Charles G. Palmer<br>Orange, Calif. (1628 E. Stafford, Santa Ana, Calif. 92667) |
|---|---|---|
| [21] | Appl. No. | 738,251 |
| [22] | Filed | June 19, 1968 |
| [45] | Patented | May 11, 1971 |

[54] DISCONTINUITY SENSOR
13 Claims, 9 Drawing Figs.

[52] U.S. Cl. .................................................. 116/114,
198/40, 200/61.42, 226/100, 235/98
[51] Int. Cl. ........................................................ G01d 21/00
[50] Field of Search ............................................ 116/114,
124; 73/(Inquired); 271/60; 226/100; 235/98.5,
98.4; 93/93; 340/259, 265, 282; 200/61.13, 61.41,
61.42; 198/40; 250/219, 223

[56] References Cited
UNITED STATES PATENTS

| 2,208,270 | 7/1940 | Grout | 235/98.4X |
| 2,617,593 | 11/1952 | Audier et al. | 250/219X |
| 2,730,301 | 1/1956 | Beamish | 235/98.4 |
| 2,828,917 | 4/1958 | Wheeler et al. | 250/219FUX |
| 2,885,787 | 5/1959 | Gray et al. | 33/174L |
| 3,219,829 | 11/1965 | Reist | 250/223 |
| 3,414,732 | 12/1968 | Steaenga | 250/223 |

Primary Examiner—Louis J. Capozi
Attorney—Harvey C. Nienow

ABSTRACT: This invention relates to discontinuity or surface irregularity sensors. Three embodiments are illustrated and described. All three illustrate application of the invention to the task of counting articles, such as newspapers, being conducted along a conveyor. Each of these three embodiments includes two surface or contour follower elements spaced apart in the direction of conveyor movement and individually mounted for movement in a degree corresponding to the value of that dimension in which discontinuities or surface irregularities are to occur. Means are provided for sensing the difference in movement of the follower elements and for providing a signal upon the occurrence of a selected difference.

PATENTED MAY 11 1971

INVENTOR.
CHARLES G. PALMER
BY
ATTORNEY

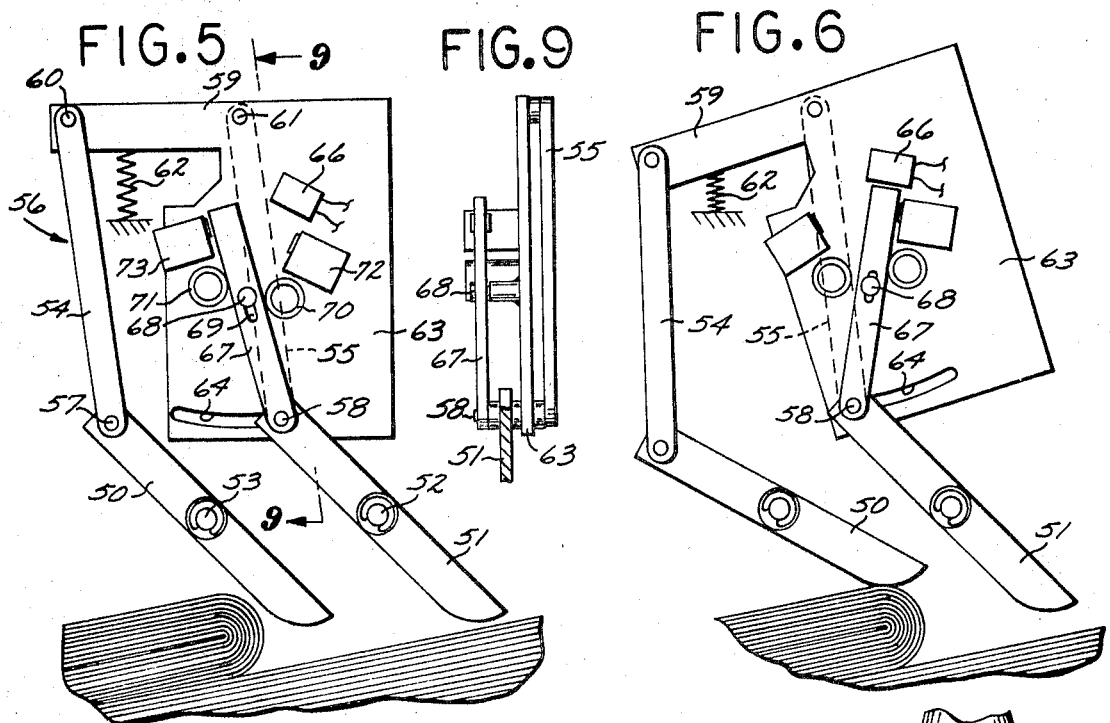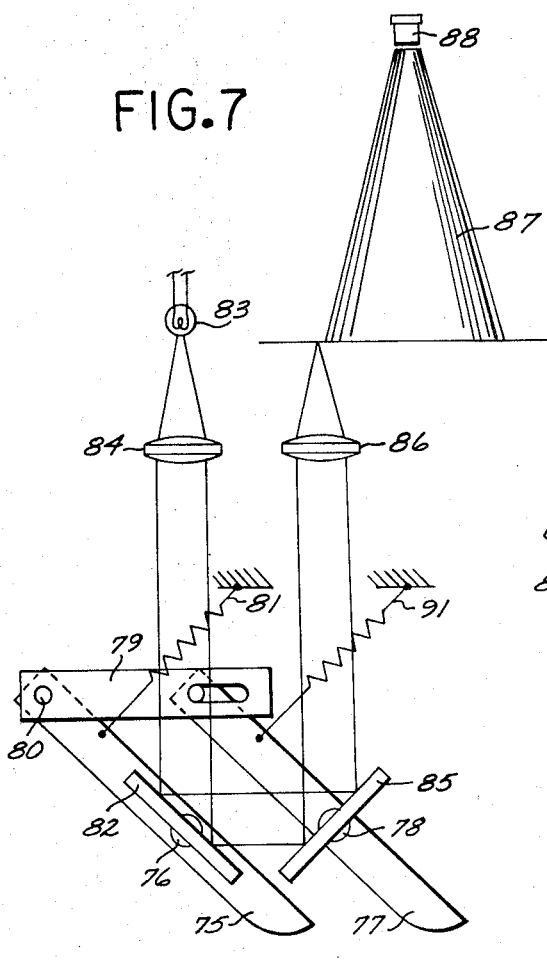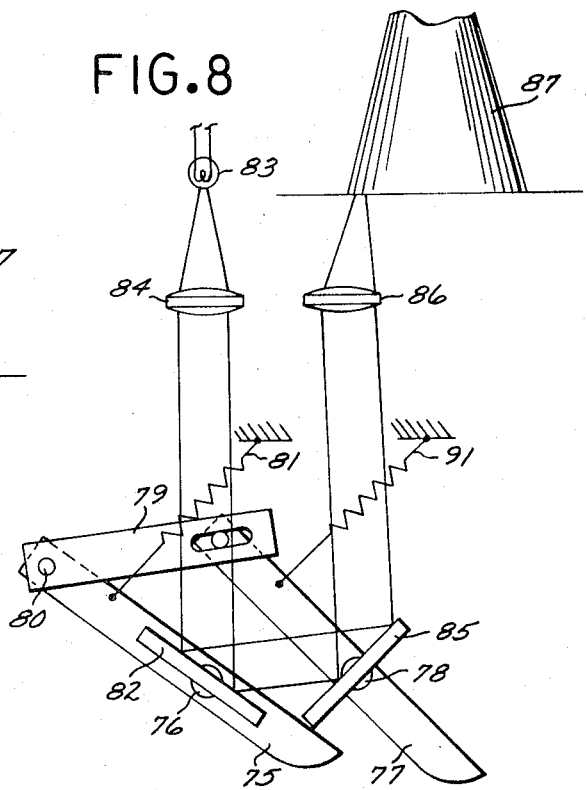

DISCONTINUITY SENSOR

This invention relates to improvements in sensors for determining the existence of discontinuities or irregularities in a surface which is movable in a given direction relative to the sensor. More particularly, it relates to an apparatus for sensing discontinuities or irregularities in a contour.

An object of the invention is to provide an improved apparatus useful for counting articles being moved along a conveyor system, for providing an apparatus which can detect irregularities in the contour of a surface whereby to serve as a counting or inspection unit and to provide an apparatus generally useful for detecting irregularities and discontinuities in a given dimension in a surface which is movable in a given direction relative to the sensing apparatus. The invention is particularly useful for counting conveyed articles which may vary in size from time to time. An example of such an application occurs in the counting of newspapers being conveyed along a newspaper conveyor after having been printed and folded in a press. On such a conveyor the newspapers are arranged in overlapping fashion with their folded edge forward and disposed one on top of the other so that each paper overlies the preceding paper with its leading edge removed several inches to the rear of the leading edge of the preceding paper. A discontinuity sensor according to the invention is capable of detecting the presence of each individual newspaper on the conveyor system by sensing the presence of the leading edge of each paper as it passes the sensor. The leading edge represents a discontinuity in the surface of the stream of papers and it is this discontinuity in the dimension of the surface contour which is detected.

While the invention has much broader application than the counting of newspapers proceeding along a conveyor, it is particularly useful for this application. Accordingly, the embodiments selected for illustration in the drawing and for detailed description herein relate to that application.

Also, it is an object of the invention to provide a discontinuity sensor which is useful in newspaper counting in that it can be made sufficiently rugged, sufficiently reliable, sufficiently accurate, and sufficiently inexpensive to produce for that application. The thickness of newspapers varies from day to day and it varies from one paper to the next on any given day. Another object of the invention is to provide an apparatus useful as a newspaper counter which will be capable of counting accurately newspapers of different thickness without the need for readjustment. This feature of the invention makes it useful for other applications as well. Accordingly, it is an object of the invention to provide an apparatus which is capable of measuring discontinuities of varying degree without need for adjustment to the anticipated degree.

Certain of these and other objects and advantages of the invention which will hereinafter appear are realized in part, in a sensor for determining the existence of discontinuities in a given dimension in a surface movable in a given direction relative to said sensor, by the provision of first and second sensing means each sensitive to the magnitude of said dimension at respectively associated positions spaced in said given direction for altering, in opposing sense, the state of the condition as a function of the magnitude of said dimension and by the provision of signal means sensitive to a change of predetermined magnitude in said state of the condition for providing a signal.

In the drawings:

FIG. 5 is a schematic view of an alternative form of newspaper counting apparatus together with the fragments of several newspapers as they appear on the conveyor system associated with the counter in the circumstance in which one newspaper has passed the counting point and before the succeeding newspaper has arrived thereat;

FIG. 6 is a schematic view of the embodiment depicted in FIG. 5 together with newspapers on a conveyor, one of which has arrived at sensing position;

FIG. 7 is a schematic view of another embodiment of the invention employing an optical system and shown in the condition in which no newspaper or discontinuity is detected;

FIG. 8 is a schematic view of the system depicted in FIG. 7 illustrating operation of the device when a discontinuity is sensed; and FIG. 9 is a fragmentary, cross-sectional view taken on line 9—9 of FIG. 5.

Figure 1:
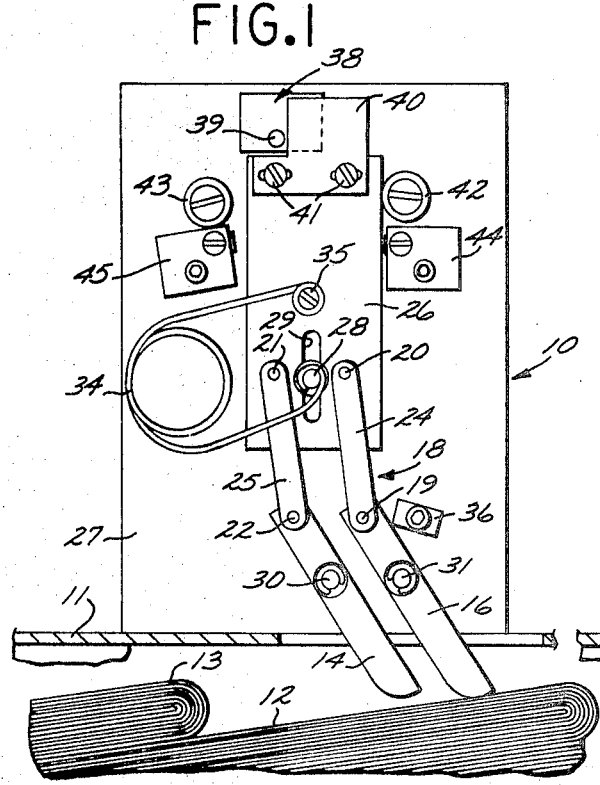
FIG. 1 is a view in front elevation of a sensing device embodying the invention which is shown associated with fragments of several newspapers as those papers appear when moving along a conveyor such that one paper has passed the counting position and the succeeding paper has not yet arrived at the counting position.

Referring to FIG. 1 of the drawing there is shown a discontinuity sensor, generally designated 10, which is mounted upon a conveyor structure 11. A series of newspapers are being conveyed by that conveyor from left to right in FIG. 1. The newspapers are placed on the conveyor so that succeeding papers overlie the preceding paper and so that the folded, leading edge of each paper is disposed several inches behind that of the preceding paper. In FIG. 1 portions of two papers, designated by the numerals 12 and 13 respectively, are illustrated. It is apparent, when the newspapers are viewed from their edge as they are in FIG. 1, that the upper surface of the series of papers includes discontinuities in the vertical direction in FIG. 1. That is, the contour of the upper surface of the series of paper undulates up and down. The magnitude of the discontinuities is a function of the newspaper thickness, being greater when the paper comprises more pages.

The discontinuity sensor 10 includes two follower elements which are mounted so that they can follow the upper contour of the series of papers at least when the contour has a discontinuity extending vertically upward from the average level of the surface. These sensors or followers are mounted so that they move in a direction which includes, as a component, movement in the direction of the discontinuity, here vertical. The newspapers move from left to right in FIG. 1 and the sensors are spaced apart in that direction of movement. A paper moving along the conveyor first strikes follower 14 and subsequently strikes, or passes under, follower 16. In operation of the device movement of the follower 14 by a discontinuity extending upwardly and moving under the follower is made to provide a signal. However, as explained below, the signal is provided as a function of the difference in the actuation of the two follower levers 14 and 16. Thus the apparatus of FIG. 1 is an example of a sensor for sensing the existence of discontinuities in a given dimension in a surface movable in a given direction relative to the sensor. It comprises first and second sensing means each sensitive to the magnitude of said dimension at respectively associated positions spaced in said given direction for altering, in opposing sense, the state of some condition as a function of the magnitude of that dimension or discontinuity. It also includes a signal means sensitive to a change of predetermined magnitude in said state of the condition for providing a signal. Three embodiments of the invention have been selected for illustration in the drawings. One embodiment is shown in FIGS. 1—4, and another is shown in FIGS. 5 and 6. In these two embodiments the state of the condition to which the signal means is sensitive is the physical state or position of the elements of a parallelogram structure. In the embodiment illustrated in FIGS. 7 and 8, it is an optical condition to which the signal means is sensitive. In a broader sense, the invention may employ any physical condition whose state may be varied by sensing means responsive to the difference in the magnitude of the dimension of a surface or contour at separate points along that surface.

Returning to FIG. 1 of the drawing, the sensor 10 comprises a parallelogram structure generally designated 18 which includes four pivot pins or points designated by the numerals 19, 20, 21 and 22, respectively. These four pivot points or pins define a four-sided FIGURE. The parallelogram structure 18 also comprises a side member 24 containing one pair of the four pivot points (i.e., pins 19 and 20). The parallelogram structure also comprises a second side member 25 which contains the other pair, 21 and 22, of the four pivot points. A crossmember 26 has pivotal connection to each of the side members 24 and 25 at a corresponding end of said members by the pivots 20 and 21. The crossmember 26 has connection by a sliding pivot 28 to the base 27 of the sensor structure 10 upon which the parallelogram elements are carried. This sliding connection includes a pin carried by one of the crossmember 26 or the frame 27 and includes a slot in the other. In the embodiment selected for illustration the pin 28 is fixed to the frame 27 and the slot 29 is formed in the crossmember 26. The slot 29 extends in a direction substantially parallel to the midline between the pair of pivot points 19 and 20 and the pair of pivot points 21 and 22 and it lies on a plane between these pairs of pivots. The reason for this arrangement will appear below. The followers 14 and 16 are pivotally mounted by pins 30 and 31, respectively, to the frame 27. The lower ends of these followers extend downwardly into the path of the articles or discontinuities that are to be sensed. Both followers extend beyond their respective pivotal connections to the frame 27 and are connected at their upper ends to respectively associated ones of the parallelogram side members. Follower 14 is connected at its upper end to the side member 25 at pivot point or pin 22. The follower 16 is connected at its upper end to the parallelogram side member 24 by the pivot pin or point 19. Means, in this case a coiled bias spring 34, are provided for biasing the crossmember 26 upwardly so that the side members 24 and 25 are drawn upwardly tending to draw the upper ends of the two followers 14 and 16 upwardly whereby the lower ends of the followers 14 and 16 will be rotated downwardly in a direction toward engagement with the surface or contour in which discontinuities are to be sensed. One end of spring 34 is connected to the frame 27 by being connected to the pivot pin 28. The other end of the spring 34 is connected to the crossmember 26 by a fastener 35. The effect of the spring action is limited by a stop 36 which engages the upper end of follower 16 as shown in FIG. 1.

At the upper end of the sensor, the numeral 38 designates a transducer which provides a signal indicating whether its light aperture 39 is covered or uncovered by the shutter 40 which is carried by the crossmember 26 of the parallelogram structure. The shutter 40 is secured to the crossmember by any convenient means such, for example, as by fastening members 41. When the follower levers 14 and 16 are manipulated the crossmember member 26 is moved up and down, a motion permitted by slot 29 in which the pin 28 is disposed, or it is rotated about the pin 28 within the limits permitted by a pair of roller pin stops numbered 42 at the right and 43 at the left, in FIG. 1, near the upper end of the crossmember 26. The other two structures, one numbered 44 and the other numbered 45, comprise magnets which react with the magnetic material of which the crossmember 26 is formed to provide a detent action. This action will be more fully described below.

While the embodiment illustrated in FIG. 1 utilizes the parallelogram principle, it is not necessary that the parallelogram structure be limited to sides which are exactly parallel or exactly alike in length. One of the advantages of the invention is that it can employ the parallelogram principle without need for such exactness. In the embodiments illustrated, the fourth member of the parallelogram is omitted and the spacing between the pivots that would define the ends of that fourth member is permitted to vary considerably so that the sides of the parallelogram need be only substantially or approximately parallel and so that the length of the sides need by only substantially or approximately the same. Accordingly, the term "parallelogram" as used herein defines not only an exact parallelogram but an approximate one as well and sensing can be accomplished by measuring parallelogram action, deviation from parallelogram action or a combination of both.

FIGS. 1 through 4 show four views of the same mechanism in different states of adjustment as the result of manipulation of its followers 14 and 16 by the newspapers being conveyed along below the followers. In FIG. 1 the mechanism is shown in quiescent condition. The lower end of follower 14 does not engage the newspaper 12 and the lower end of follower 16 just barely engages it so that neither follower is urged to rotation by the paper. Instead the position of the elements of the sensor are determined by the bias of spring 34 and the position of stops 36 and 42. The rotational position of the crossmember 26 is limited by stop 42. Upward movement of the crossmember 26, and of the other elements of the sensor, are limited by stop 36. In FIG. 1 the follower elements 14 and 16 experience like rotation (in this case no rotation) and in this state of follower rotation shutter 40 is moved to a position to clear the aperture 39 whereby light reaching the transducer 38 provides a signal indicating no differential or small differential in the rotational position of the followers 14 and 16.

Figure 3:
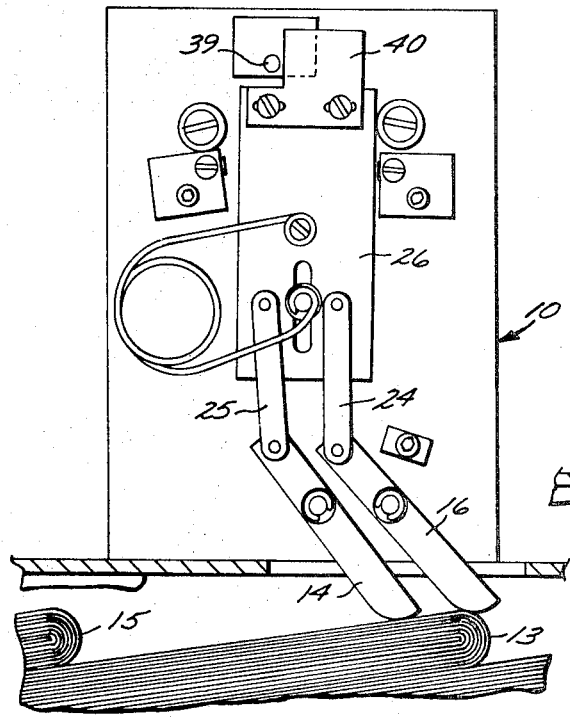
FIG. 3 is a view in front elevation of the sensing device shown in FIGS. 1 and 2, together with fragments of several newspapers as they appear when traveling along a newspaper conveyor and when one newspaper has just passed the counting position.

FIG. 3 illustrates the apparatus at a time when the conveyor system has moved the newspaper 13 to a position in which both of the follower levers 14 and 16 are forced through a similar rotational angle. Comparison of FIGS. 1 and 3 will show that the followers 14 and 16 have been rotated counterclockwise, that the parallelogram side members 24 and 25 have been drawn downwardly, and that the crossmember 26 and its shutter 40 have been drawn downwardly. However, despite the fact that both of the follower levers have been rotated the aperture 39 remains uncovered because the sensor 10 provides its discontinuity signal only when there is a predetermined differential in the degree of rotation of the two followers.

Figure 2:
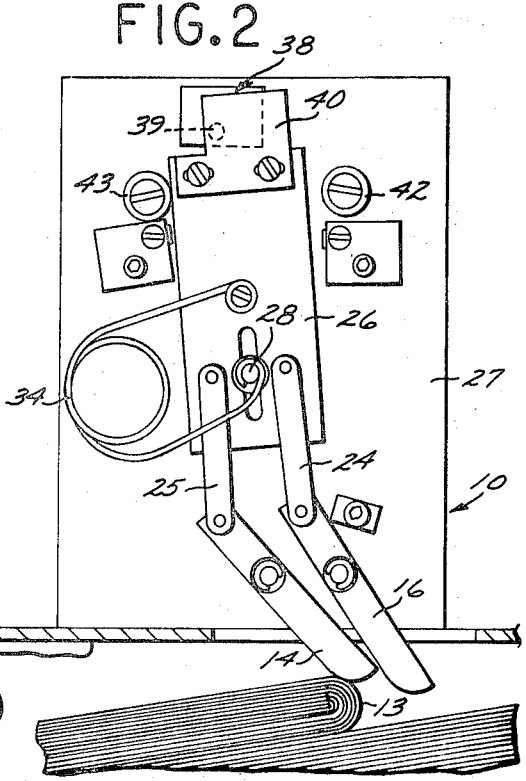
FIG. 2 is a view in front elevation of the sensing device of FIG. 1, together with a fragment of several newspapers as they appear when moving along a newspaper conveyor in the case in which a newspaper has arrived at a point, relative to the sensing apparatus, at which its presence is to be sensed.

Referring now to FIG. 2, the several elements of the sensor 10 are shown at a time intermediate the time depicted in FIGS. 1 and 3 when the leading edge of the newspaper 13 has engaged and rotated the follower 14 but prior to the time when the paper 13 has engaged and rotated the follower 16. Rotation of follower 14 in the counterclockwise direction, as shown, results in the downward movement of the parallelogram side member 25 against the bias of spring 34. Follower 16 has not been rotated so no downward force has been applied to the side member 24. As a consequence the crossmember 26 is rotated about pivot 28 in a counterclockwise direction out of engagement with stop 42 and into engagement with the left stop 43. The transducer 38 and its aperture 39 are fixed relative to the frame 27 and the shutter 40 is movable with the crossmember 26. The shutter 40 moves to a position in which it covers the aperture 39 as shown in FIG. 2 whereupon the transducer 38 provides a signal indicating that a difference, greater than some selected amount of difference, has occurred in the rotational position of the followers 14 and 16.

Summarizing, when the lower ends of followers are at the same level the two followers can be raised and lowered by equal amounts without rotating shutter 40. If follower 14 is raised above the lower level of follower 16 the shutter rotates until it engages stop 43. Further deflection of follower 14 relative to follower 16 causes crossmember to roll up the roller stop 43 and this raises follower 16. When follower 16 is raised to the level of follower 14 the shutter 40 will rotate in the opposite direction until it strikes stop 42. It will be apparent that the use of two levers and the use of a sensing structure which responds to the difference in their rotation rather than the magnitude of the rotation of one of them, provides a unit which will sense discontinuities in the surface being gauged without need to change calibration of the unit when the magnitude of the discontinuity is changed.

Newspapers are moved along conveyors at a relatively rapid rate so that the occurrence of discontinuities, that is the arrival at the sensor of succeeding papers, may occur at a frequency near the resonant frequencies of some of the structures incorporated in the sensor. A preferred form of the invention includes means for limiting the ease with which the sensor elements may vibrate and respond to vibration. Thus, a preferred form of the invention includes a detent means which tends to oppose initiation of a change in the state of the sensor elements more than it opposes completion of that change once initiated. Advantageously, this means has a form depicted in FIGS. 1 through 4. In this embodiment two magnets are affixed to the frame 27 one at each side of the crossmember 26. The crossmember is made of magnetic material, or is provided with a magnetic attachment at a point proximate to the magnet structures 44 and 45. In its extreme rotational positions the crossmember 26 engages or comes close to engagement with one of these magnet structures. The attraction of the crossmember to the magnets is a nonlinear function of the separation between the crossmember and the magnet and is much greater when the crossmember is closely adjacent the magnet whereby a detent action results.

Figure 4:
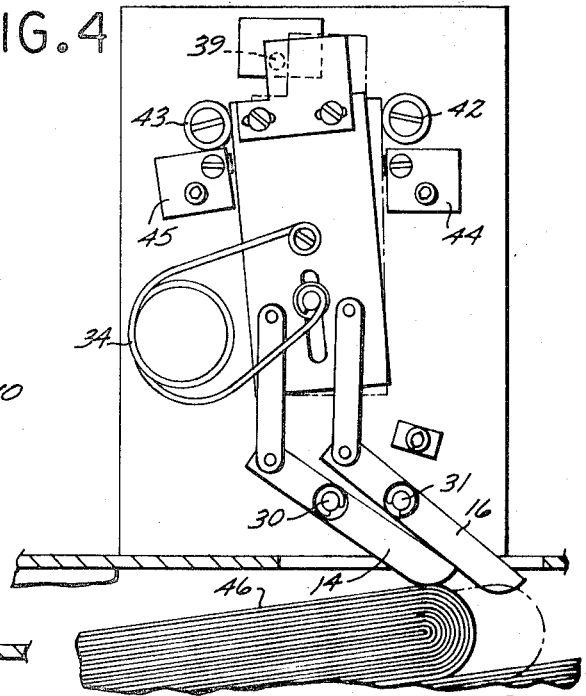
FIG. 4 is a view in front elevation of the sensing mechanisms of FIGS. 1, 2 and 3, together with a fragment of a newspaper as it appears when moving along a conveyor system and in which one paper, having greater thickness than any of the papers shown in FIGS. 1, 2 and 3, has arrived at the point at which it is to be counted.

Another structural feature which aids in avoiding the problems of vibration and adds materially to the life of the sensor is illustrated in FIG. 4. The pivots 30 and 31 on which the followers 14 and 16 are mounted, are spaced so that the lower end of follower 14 engages follower 16 after some predetermined amount of rotation of the follower 14. This arrangement permits counting of very thick newspapers, such as the paper 46 without undue increase in the differential between rotation of the two followers. The dashed lines in FIG. 4 illustrate that the unit will operate in the same fashion as described in connection with FIGS. 1, 2 and 3 even when the thickness of the newspaper is greatly increased.

To insure that differential operation of the discontinuity sensors results in an action which is distinguishable from the action produced when the sensors are actuated in corresponding degree, means are provided to insure that result. In the embodiment of FIGS. 1 through 4 this means comprises a pivotal connection between the frame or ground reference structure 27 and the crossmember 26. The pivot axis is located between the parallelogram side members 24 and 25 and the slot in which the pivot moves extends in a direction parallel to the plane lying midway between the two side members.

The embodiment illustrated in FIGS. 5 and 6 also incorporates a means for insuring response to differential movement rather than degree of movement of the sensing elements.

In the embodiment illustrated in these two FIGS. this means comprises a structure in which two opposite pivots, of the four pivots that make up the parallelogram structure, are confined so that the degree of their separation is limited to a predetermined range of separation. Referring to FIG. 5 two follower elements are provided. One is designated by the numeral 50 and the other by the number 51. Follower 51 is mounted upon a pivot 52 at a point downstream, in terms of paper stream and conveyor movement, from the follower 50 which is mounted for rotation upon a pivot 53. The upper ends of the followers 50 and 51 are pivotally connected to the lower ends of the side member 54 and 55 respectively, of a parallelogram structure generally designated 56. The connection between follower 50 and side member 54 occurs at pivot point 57 and the connection between follower 51 and side member 55 occurs at pivot 58. At their upper ends side members 54 and 55 are interconnected by a crossmember 59 which has pivotal connection to the upper end of side member 54 at a pivot point 60 and has pivotal connection to the upper end of side member 55 at a pivot 61. Means, such for example as the spring 62 are provided for urging this assembly into a position in which the followers 50 and 51 are moved to the extreme clockwise rotational position which they are shown to occupy in FIG. 5. The side member 55 is not clearly visible in FIGS. 5 or 6 because it is disposed behind a downward extension of the crossmember 59. This extension 63 is provided with arcuate slot 64. The pivot pin 58 extends through this slot and is freely movable in the slot.

In operation of the unit of FIGS. 5 and 6, thus far described, when the two followers 50 and 51 are rotated counterclockwise in like degree they pull downwardly on the side members 54 and 55 of the parallelogram structure which in turn pulls down crossmember 59 against the bias of bias means 62. There is no change in the angle between the side members 54 and 55 and the crossmember 59 so that the extension 63 remains in the relative position shown with the pin 58 at one end, the right end in FIG. 5, of the arcuate slot 64. However, when follower 50 is rotated counterclockwise in a degree exceeding the counterclockwise rotation of follower 51, then the elements of the parallelogram assume the position depicted in FIG. 6. Side member 54 is pulled downwardly to pull down the left end of crossmember 59 against the spring 62. There being no rotation of follower 51, the side member 55 is not pulled down and its upper end at pivot 61 remains in approximately original position. The result of this action is to rotate the crossmember 59 about the pivot point 61 to carry the extension 63 counterclockwise to the right, in FIG. 6. This movement is made possible because the slot 64 is formed on an arc with its center at pivot 61 or at least the slot includes such an arc within its boundaries. It will be apparent that in FIGS. 5 and 6 differential rotation of the followers 50 and 51 results in the leftward rotation of extension 63 of crossmember 59 about the pivot point 61. This rotation is measured and indicated by interaction between a magnetic sensor unit 66 and an arm 67, at least the upper end of which is provided with a magnetic material of sufficient magnetic strength so that its presence and nonpresence adjacent sensor 66 is indicated by the latter. This arm is pivoted at its lower end upon the pivot point 58 and it is pivoted upon the downward extension 63 of the crossmember 59 at a point intermediate pivot 61 and slot 64 upon a pivot pin designated by the numeral 68. The pivot 68 slides in a slot in one of the members, here slot 69 in member 67. This slot is required to prevent binding of the mechanism in view of the fact that the distance from pivot 61 to slot 64 exceeds the distance from pivot 68 to pivot 58. Alternatively, the slot 64 could be widened to prevent such binding. The arrangement of these several elements and their pivots is best shown in FIG. 9. This embodiment is shown in FIGS. 5 and 6 to include a pair of stops 70 and 71 and a pair of magnetic elements 72 and 73 which comprise a detent structure. Elements 70, 71, 72 and 73 have the same function as do elements 42, 43, 44 and 45 of FIG. 1.

FIGS. 7 and 8 illustrate an alternative form of the invention which includes an optical system. Referring to FIG. 7 the numeral 75 designates a contour follower pivoted upon a pivot point 76 and the numeral 77 designates a similar contour follower pivoted upon a pivot 78. The upper end of these two followers are pivoted to a crossmember 79. The upper end of follower 75 is pivoted to the crossmember 79 at a pivot point 80 and the follower 77 has a sliding pivotal connection to the crossmember 79 by a pivot and slot combination. In the embodiment shown the pivot is carried by the upper end of the follower 77 and the slot is formed longitudinally in the member 79. A means, comprising a spring 81 connected to follower 75 and a spring 91 connected to follower 77, is provided for biasing this parallelogram structure such that the followers 75 and 77 are rotated into the extreme clockwise position they are shown to occupy in FIG. 7. A mirror 82 is mounted upon the follower member 75 to intercept light rays from a source 83 after collimation in a lens 84 and to direct it to mirrors 82 and 85 which are mounted upon the followers 75 and 77, from whence the column of light is directed to a lens 86 which focuses the light rays at some focal point distant from the lens. The two mirrors 82 and 85 are mounted upon the followers 75 and 77, respectively, so that they are rotated when the followers are rotated. The system also includes a light collector structure 87 such, for example, as a cone of plastic material which will direct to its apex light received at its base. A light sensor 88 mounted at the apex senses the presence or the absence of light. The mirrors 82 and 85 are oriented so that when the followers 75 and 77 are rotated in like degree the focal point above lens 86 falls without the base of the light collector 87. It will be apparent that several mirror orientations will accomplish this result and one such orientation is depicted in FIG. 7. When the follower 75 is rotated counterclockwise more than is the follower 77 then the focal point of light emanating from the lens 86 will be moved so that the light will enter the base of the light collector 87 permitting indication by the sensors 88 of the fact that there is a differential in the degree of rotation of the two followers.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. A sensor for sensing the existence of discontinuities in a given dimension in a surface movable in a given direction relative to said sensor, comprising in combination:

first and second sensing means each sensitive to the magnitude of said dimension at respectively associated positions spaced in said given direction for altering, in opposing sense, the state of a condition as a function of the magnitude of said dimension; and signal means sensitive to a change of predetermined magnitude in said state of the condition for providing a signal;

in which said signal means comprises a parallelogram structure including four pivot points spaced to define a foursided figure the opposite sides of which are approximately parallel, said parallelogram structure further comprising first and second parallelogram side members extending between respectively associated pairs of said pivot points, a crossmember pivotally connected to each of said parallelogram side structures at a respectively associated pivot point at a corresponding end of each of said side members, said first and second sensing means comprising first and second contour follower elements spaced apart in said selected direction and mounted for movement in a degree corresponding to the value of said dimension of the surface and each of said followers having connection to an associated one only of said parallelogram side structures at the pivot point at the other end of said parallelogram side structures.

2. The invention defined in claim 1, in which said crossmember is mounted for rotational movement about an axis substantially parallel with the axis of said pivot points and lying on a line extending between said respectively associated pairs of pivot points.

3. The invention defined in claim 2, in which said crossmember is further mounted for movement in the direction of said line; said signal means being sensitive to pivotal movement of said crossmember and being insensitive to movement of said crossmember in the direction of said line.

4. The invention defined in claim 3, including detent means for exerting force to oppose initiation of rotational movement of said crossmember.

5. The invention defined in claim 4, in which said detent means comprises a magnetic element disposed in the path of movement of said crossmember disposed one at the limit of rotational movement of the crossmember in each direction.

6. The invention defined in claim 1, including movement restricting means for restricting movement of a member of said parallelogram structure substantially to one direction of movement as an incident to differential in the movement of said followers and for preventing substantial movement of said member of the parallelogram structure in said one direction of movement when said followers are moved in like degree.

7. The invention defined in claim 6, including a ground reference structure from which parallelogram member and follower movement may be gauged, and in which said movement restricting means comprises a sliding pivotal connection between one member of said parallelogram and said ground reference structure.

8. The invention defined in claim 7, in which said movement restricting means comprises a pivotal connection between said crossmember and said ground reference structure permitting relative movement between them on a line extending between said pairs of pivot points.

9. The invention defined in claim 6, in which said movement restricting means comprises means for limiting the separation between two opposite pivot points of said four pivot points to a selected range of separation.

10. The invention defined in claim 6, in which said movement restricting means comprises a sliding pivotal connection between said crossmember and the pivot point connected to one of said followers.

11. A dimension variation sensor for sensing dimensional variations in structures moving relative to the sensor in one direction by detecting variations in position of surface contour followers engaged therewith comprising:

a pair of surface contour followers spaced apart in said one direction;

means pivotally mounting said followers individually for independent rotation in response to dimensional variation in the contour of said relatively moving structures and in a degree corresponding to that variation; and signal means for comparing follower rotation and for providing a signal in response to a difference in rotation greater than the determined difference.

12. The invention defined in claim 11, which further comprises means, including biasing means and an element connecting said surface contour followers, for urging said followers to a predetermined relative rotational position at any degree of rotation of either of them.

13. An article counting sensor for sensing articles moving in one direction past the sensor comprising:

a pair of rotatable surface followers mounted for independent rotation on respectively associated axis spaced in said one direction;

biasing means for biasing said followers toward a predetermined relative position while permitting individual and joint rotation of said followers;

signal means for providing an output signal indicative of a difference in degree of rotation of said followers greater than a predetermined degree, said signal means comprising an element connected to both of said followers and pivoted for rotation as an incident to change in relative rotation of said followers.